United States Patent [19]
Oliver et al.

[11] Patent Number: 5,688,293
[45] Date of Patent: Nov. 18, 1997

[54] METHOD OF MAKING A GEL ELECTROLYTE BONDED RECHARGEABLE ELECTROCHEMICAL CELL

[75] Inventors: Manuel Oliver, Norcross; Paul J. Gies, Atlanta; Shekhar L. Pendalwar, Lawrenceville; Christen E. Coalson, Atlanta; Florence O. Eschbach, Duluth, all of Ga.

[73] Assignee: Motorola, Inc., Schaumburg, Ill.

[21] Appl. No.: 647,548

[22] Filed: May 15, 1996

[51] Int. Cl.⁶ .................................................. H01M 6/00
[52] U.S. Cl. ................... 29/623.1; 29/623.2; 29/623.4; 29/623.5; 29/623.3
[58] Field of Search .............................. 29/623.1–623.5

[56] References Cited

U.S. PATENT DOCUMENTS 4,218,275  8/1980  Kadija et al. ........................ 29/623.2
5,456,000  10/1995  Gozdz et al. ........................ 29/623.2
5,478,668  12/1995  Gozdz et al. ........................ 429/127

*Primary Examiner*—Bruce F. Bell
*Attorney, Agent, or Firm*—Kenneth M. Massaroni; Scott M. Garrett

[57] ABSTRACT

An electrochemical cell 10 includes first and second electrodes 12 and 14 with an electrolyte system 26 disposed therebetween. The electrolyte system includes at least a first and second layer 28 and 30, the second layer 30 being used to absorb an electrolyte active species and to adhere the adjacent layer of electrode material to the electrolyte 26. The electrolyte system further includes a process for packaging and curing the electrolyte after it has been incorporated into a discrete battery device.

12 Claims, 7 Drawing Sheets

METHOD OF MAKING A GEL ELECTROLYTE BONDED RECHARGEABLE ELECTROCHEMICAL CELL

TECHNICAL FIELD

This invention relates in general to the field of electrolytes for electrochemical cells, and more particularly to methods of making electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there has been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as they are found in conventional cell batteries or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessened the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. Thereafter, the solvent and the electrolyte salt may be introduced into the polymer system in order to swell and activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically highly hygroscopic) it offers problems with respect to performance and assembly. First, the gel electrolyte may lack sufficient mechanical integrity to prevent shorting between the electrodes while they are being bonded or laminated together with the electrolyte. The electrolyte layer thickness is reported to be 75 µm, presumably to overcome this shorting problem and to help facilitate handling of the electrolyte material. When compared to the 25 µm typical thickness for separtors used in liquid lithium ion cells, this results in a significant reduction in the volumetric energy density for the cell.

Second, in order to create porosity in the electrolyte and electrode layers that will be used to absorb liquid electrolyte, a plasticizer is used. Unfortunately, the removal of this plasticizer requires the use of flammable organic solvents. In addition to the safety hazard that is created, the time required for the solvent extraction process renders it relatively expensive. These problems are significant limitations to the successful implementation of gel electrolytes and electrochemical cells.

Accordingly, there exists a need for a new electrolyte system which combines the properties of good mechanical integrity, as well as the ability to absorb sufficient amounts of electrolyte active species so as to produce an electrolyte with high ionic conductivity characteristic of liquid electrolytes. The electrolytes so formed should also avoid excessive swelling and all of the problems associated therewith.

DETAILED DESCRIPTION OF THE PREFERRED EMBODIMENT

Figure 1:
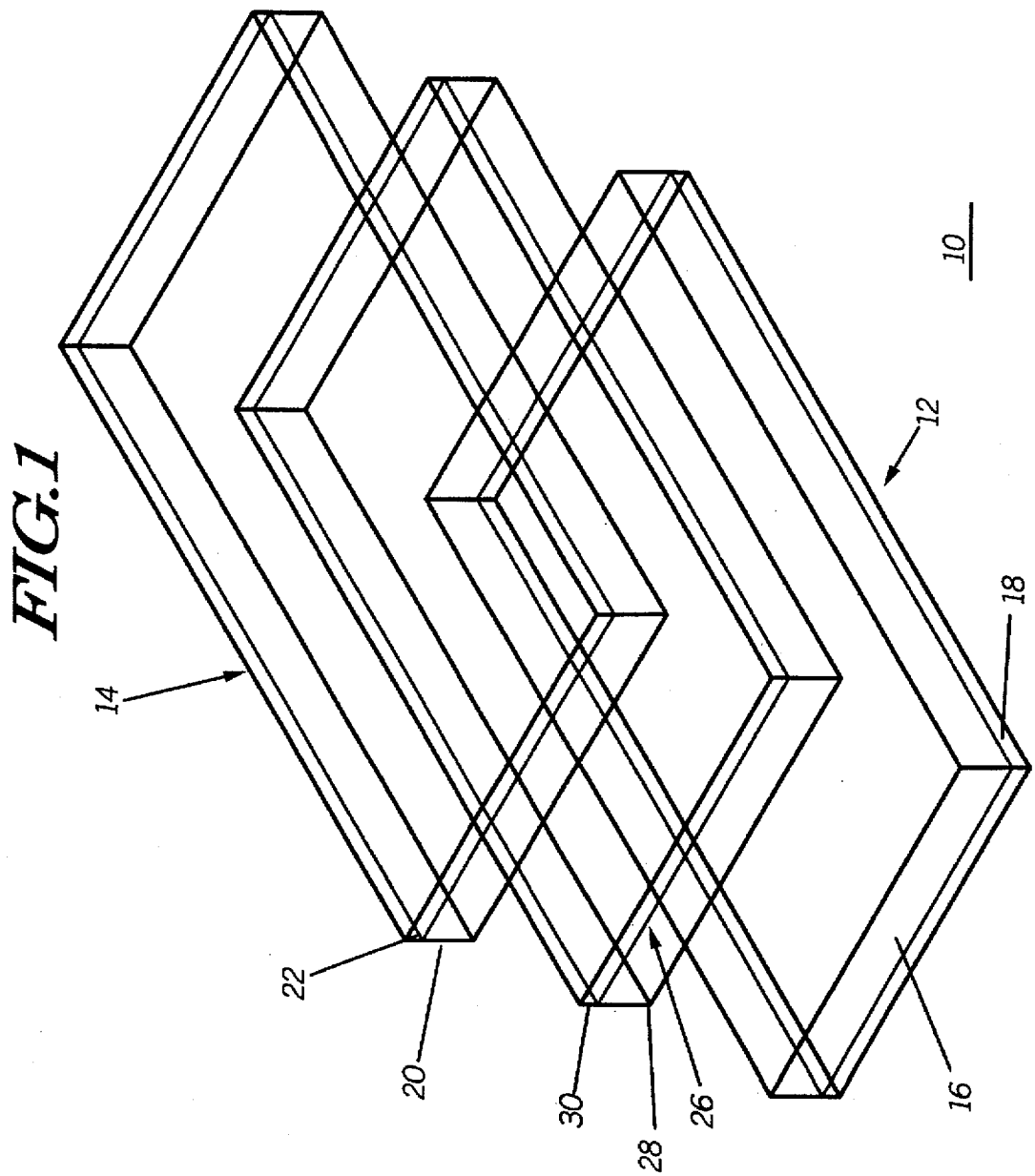
FIG. 1 is an exploded perspective view of an electrochemical cell in accordance with this invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an exploded perspective view of a gel electrolyte bonded electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known appropriate methods for lithium rechargeable cells, examples of which include metallic lithium, lithium, lithium alloys, such as lithium, aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled Improved Carbon Electrode Materials For Lithium Battery Cells And Method of Making Same, filed on Nov. 22, 1995, to Jinshan Zhang, et al., the disclosure of which is incorporated herein by reference.

More particularly, the anode 12 comprises a layer 16 of carbon material as described hereinabove deposited on substrate material 18. The substrate material may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of the lithium intercalation material such as is known in the art, examples of which lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, copending U.S. patent application Ser. No. 08/464,440 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of known materials known in the art, examples of which include aluminum, nickel, and combinations thereof. In one preferred embodiment, substrate 22 is fabricated of aluminum.

Disposed between electrodes 12 and 14 is an electrolyte system layer 26. The electrolyte system 26 comprises an electrolyte active species and a multiphase polymer gel electrolyte support structure consisting of at least two different polymers. A first polymer is provided as an absorbing phase and the second polymer is provided as an inert phase. The inert phase, 28 is provided to give mechanical integrity and structural rigidity to the electrolyte system. The layer of absorbing phase material 30 is adapted to engage the electrolyte active species therein.

The electrolyte active species is a liquid or solid component (or both) which provides ionic conductivity between the anode and the cathode. In the embodiment in which the electrochemical cell 10 is a lithium intercalation cell, the electrolyte active species consists of a alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as. $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof. The solvent into which the salt is dispersed is typically an organic solvent including, but not limited to, propylene carbonate (PC), ethylene carbonate (EC), diethyl carbonate (DEC), dimethyl carbonate, dipropylcarbonate, dimethylsulfoxide, acetonitrile, dimethoxyethane, tetrahydrofuran, n-methyl-2-pyrrolidone (NMP), and combinations thereof. For other electrode combinations, i.e., Ni—Cd or Nimetal hydride, other electrolyte active species may be used, such as KOH.

Figure 2:
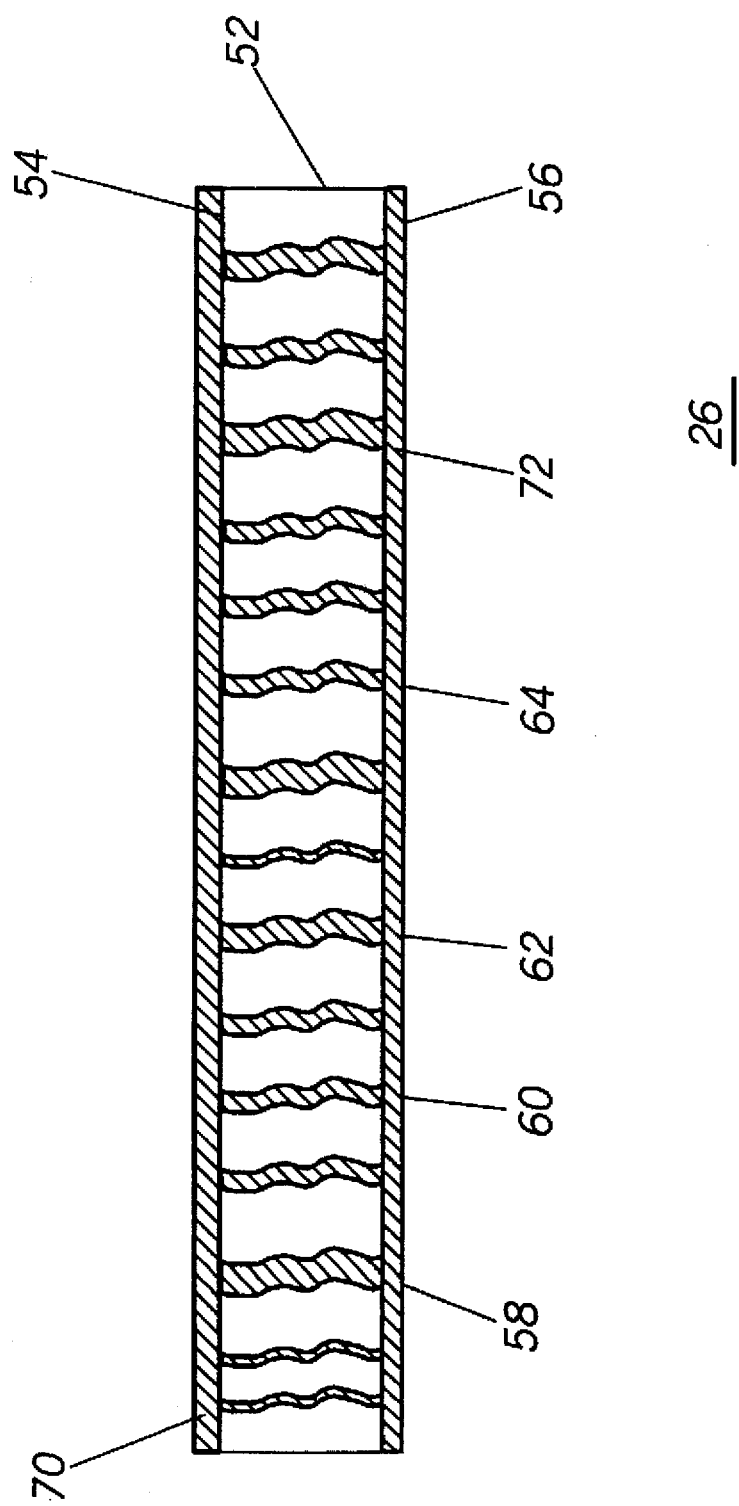
FIG. 2 is a cross sectional side view of an electrolyte system for an electrochemical cell, in accordance with the instant invention.

Referring now to FIG. 2, there is illustrated therein a cross-sectional side view of the electrolyte system 26 of FIG. 1. The electrolyte system 26 comprises a first polymer phase 52 which is formed of a layer of inert polymer material. The term inert refers to the fact that the material itself is not absorbing, though the layer of material, due to its porosity as described below) may be absorbing. This inert component may be fabricated or selected from the group of materials consisting of polyalkenes such as polyethylene, polypropylene, polytetrafluroethylene, polystyrene, polyethyleneterephthalate, ethylene propylene diene monomer, nylon, and combinations thereof.

Layer 52 includes first and second major surfaces 54 and 56, respectively. Layer 52 may preferably be fabricated of polyethylene or polypropylene and is a highly porous layer having a plurality of pores, for example, 58, 60, 62 and 64 formed therein and therethrough. Indeed, the porosity of layer 52 is typically on the order of between 20 and 80%, and preferably between about 28 and 50%. As layer 52 is a layer of inert polymeric material, it is hence provided to enhance the mechanical strength or integrity of the polymer electrolyte system. The inert layer may also be considered as a separator layer between the electrodes.

Disposed on at least one of the first and second major surfaces, 54, 56 is a layer of an absorbing or gel-forming polymer 70. The absorbing or gelforming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. As illustrated in FIG. 2, the layer of the second polymeric material 70 is disposed on surface 54 of layer 52, and said polymeric material extends at least partially into and preferably through the pores in layer 52. As noted, the second layer of a second polymeric material 72 may be disposed on the second major surface 56 of layer 52. By disposing a layer of the second polymeric material on both sides of layer 52, it may be appreciated that the likelihood of completely filling the pores is increased.

Thereafter, the polymer system illustrated in FIG. 2 may be cured as by subjection to heat, radiation, or by other means known in the art. Curing has the effect of driving off excess solvent in the liquid electrolyte active species, causing the viscous layer of second polymeric material to gel into a contiguous sheet. For example, mixing PVDF with PC, EC, or DEC containing liquid electrolyte at room temperatures and in a ratio of between 1:1 to 1:10, with a preferred ratio of 1:3 to 1:7, yields a paste like consistency. This paste may then be spread over for example, a polypropylene or polyethylene first polymeric phase as by a doctor blade or conventional coating processes. Thereafter, the PVDF paste is heated to temperatures of approximately 50° to 150° C. and preferrably between 80° and 120° C. so that the solvents will dissolve the PVDF. Thereafter upon cooling, the PVDF is converted to a homogenous gel. The exact temperature will depend on the composition of the liquid electrolyte. During the heating process as the PVDF dissolves, it seeps or is drawn into the pores of the high density polyethylene phase, thus resulting in a "filled" two-phase polymer system.

Figure 3:
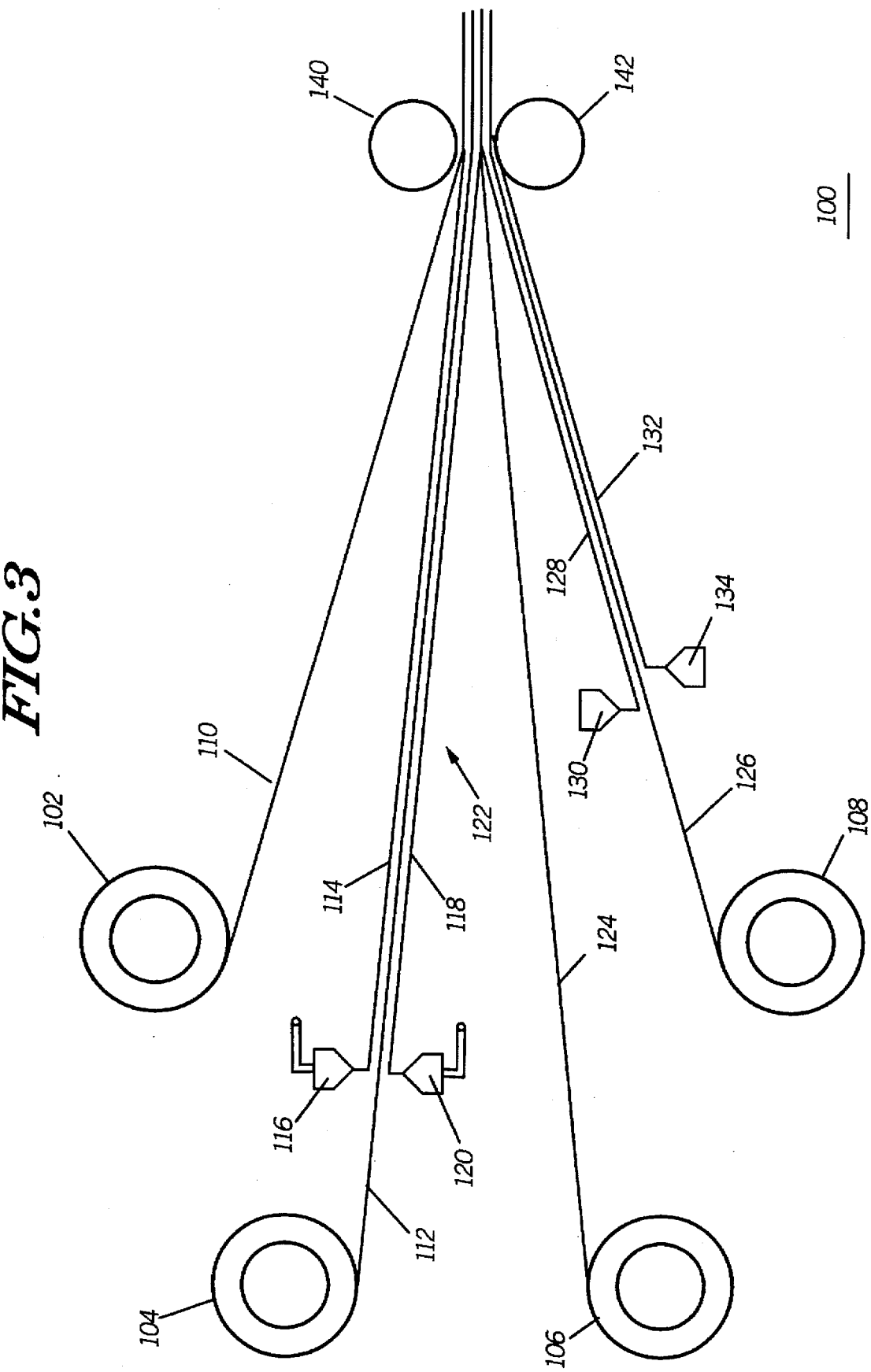
FIG. 3 is a stylized view of the steps for assembling a plurality of component materials into a discrete battery cell.

A process for making a rechargeable electrochemical cell as illustrated in FIG. 1, hereinabove, is illustrated herein. Specifically, FIG. 3 illustrates an apparatus 100, including a plurality of rolls, 102, 104, 106, and 108 of electrode and electrolyte starting materials. A first electrode material 110 may be paid off of roll 102, while a first layer of inert electrolyte material 112 is paid off of roll 104 and onto which is disposed a layer or layers of absorbing electrolyte material 114 by dispenser 116. A second layer of absorbing polymer material may optionally be deposited on the second side of inert polymer 112, as by dispenser 120. Adjacent the coated layer of electrolyte material 122 is disposed a layer of the second electrode material 124 paid off of roll 106. A second layer 126 of inert electrolyte polymer material may be paid off of roll 108 and onto which is disposed a layer of an absorbing polymer material 128 which is applied via dispenser 130. As with layer 112, a second layer of absorbing polymer material 132 may optionally be deposited on inert polymer 126 via dispenser 134. While the absorbing electrolyte layer is illustrated in FIG. 3 as being deposited via a curtain coating process, it is to be understood that the invention is not so limited. Other coating processes known in the art may be employed.

The materials paid off of the four rolls and may be compressed together by a pair of compression rollers, 140, 142, so as to remove excess electrolyte. It is to be understood that the absorbing polymer disposed on top of the layers of inert polymers also serve the secondary function of being a bonding paste which adheres the layers of electrode material to the layer of electrolyte material disposed therebetween. The roll may also be wound to form a final desired shape.

Figure 4:
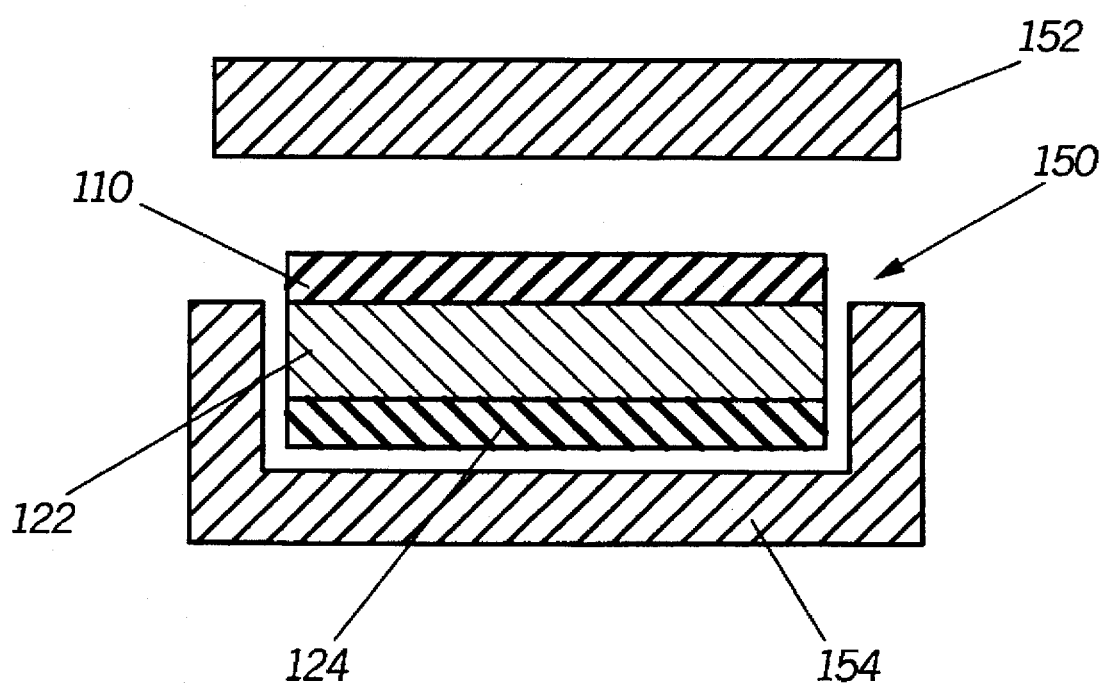
FIG. 4 is a cross-sectional view of a battery cell in accordance with this invention, illustrating the step of sealing a cell in a packaging material.

After rolling the layers of electrode and electrolyte material as illustrated in FIG. 3, the continuous roll of electrochemical cell material resulting from the rolling process may thereafter be singulated into discrete cells. Discrete cells are then packaged between sheets of a vapor impermeable package as is illustrated in FIG. 4. More particularly, discrete cell 150, is packaged between sheets of water vapor impermeable material such as metal foil laminates. Sheets 152 and 154 enclose the discrete package, or battery cell 150. The package is sealed and the battery cell is cured by exposing both to a compression and heating step. More particularly, the packaged discrete battery cell is exposed to a temperature of between 50° and 150° C. for a period of time between 6 and 3600 seconds, and probably between 60 and 120 seconds. The exact time will depend on the size of the cells themselves. The compression force used to seal and cure and battery pack is on the order of between 1 and 500 lbs/cm$^2$ and preferably between 50 and 100 lbs/cm$^2$. This heating and pressing step results in the absorbing polymer material being dissolved wherein it seeps or is forced into the pores of the inert polymer. When the polymer cools and solidifies, or "gels" it serves the additional function of adhering the layers of electrode material to the electrolyte.

The invention may be better understood from a perusal of the following examples:

EXAMPLES

Example 1

Anode
composition: 88% graphite (Timcal SFG-44), 12% PVDF (Kynar 461 from Elf-Atochem)
dimensions: 5.5 cm×29 cm (coated)
current collector: Cu mesh (50 µm thickness)
loading: 18 mg/cm2
Cathode
composition: 87.2% LiCoO2, 7.4% graphite (Timcal KS-6), 2.4% C black, 3.1% PVDF (Kynar 461 from Elf-Atochem)
dimensions: 5.1 cm×20 cm (coated)
current collector: Al mesh (50 µm thickness)
loading: 44 mg/cm2
Electrolyte System: Polypropylene (Celgard 2400 from Hoescht-Celanese Corp.) (25 µm), dimensions: 5.8 cm×44 cm, and 85% 1 M LiPF6 in EC/DEC (40:60) dispersed in 15% PVDF (Kynar 461).

The electrodes were coated onto the mesh using a solvent casting process with n-methyl-2-pyrrolidone (NMP), with a drying temperature of approximately 120° C. After coating, the electrodes were calendered to reduce the porosity to approximately 30% for the cathode and 35% for the anode, and then cut to size. Ni and Al tabs were welded to uncoated areas of the current collectors for the anode and cathode, respectively.

The electrodes and separator were vacuum dried for 1.5 hours in at 70° C. The cell was assembled in a glovebox environment to minimize water contamination. The electrolyte was applied to both sides of each electrode and the separator and stacked. The cell was then folded (2 folds for the cathode, 3 for the anode) so that a prismatic cell of approximate size (6×7 cm was obtained).

Figure 5:
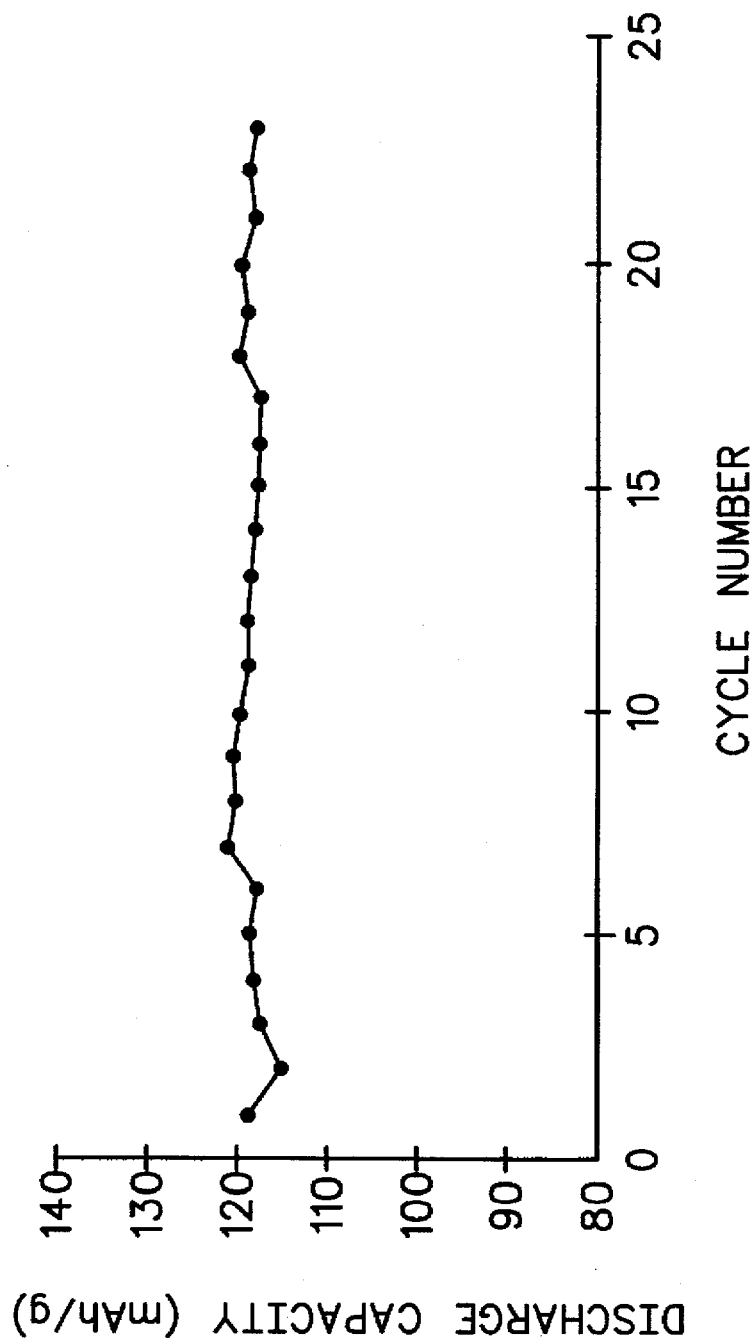
FIG. 5 is cycling data for a first electrochemical cell fabricated in accordance with the invention.

The cell was then placed in polypropylene bag before being heat sealed into metal laminate packaging capable of excluding water vapor. The cell was then gelled by heating it to 90° C. for 5 minutes between two insulated metal plates. The weight of the plate, 2.2 kg, provided some force to compress the cell during gelling. After gelling the cells were cycled between 3.0 and 4.2V to examine cyclability the results are shown in FIG. 5.

Example 2

Anode
composition: 88% graphite (Timcal SFG-44), 12% PVDF (Kynar 461)
dimensions: 3×2.25 cm
current collector: Cu mesh (50 µm thickness)
Cathode
composition: 87.2% LiNiO2, 7.4% graphite (Timcal KS-6), 2.4% C black, 3.1% PVDF (Kynar 461)
dimensions: 3×2.25 cm
current collector: Al mesh (50 µm thickness)
Electrolyte System: Polypropylene (Celgard 2400 from Hoescht-Celanese Corp.) (25 µm), dimensions: 4 cm×4 cm, and 85% 1 M LiPF6 in EC/DEC (40:60) dispersed in 15% PVDF (Kynar 461).

The electrodes were coated onto the mesh using a solvent casting process with NMP, with a drying temperature of approximately 120° C. After coating, the electrodes were calendered to reduce the porosity to approximately 30% for the cathode and 35% for the anode, and then cut to size. Ni tabs were welded to uncoated areas of the current collectors for the anode and cathode, respectively.

The electrodes and separator were vacuum dried for 1.5 hours in at 70° C. The cell was assembled in a glovebox environment to minimize water contamination. The electrolyte was applied to both sides of each electrode and the separator and stacked.

Figure 6:
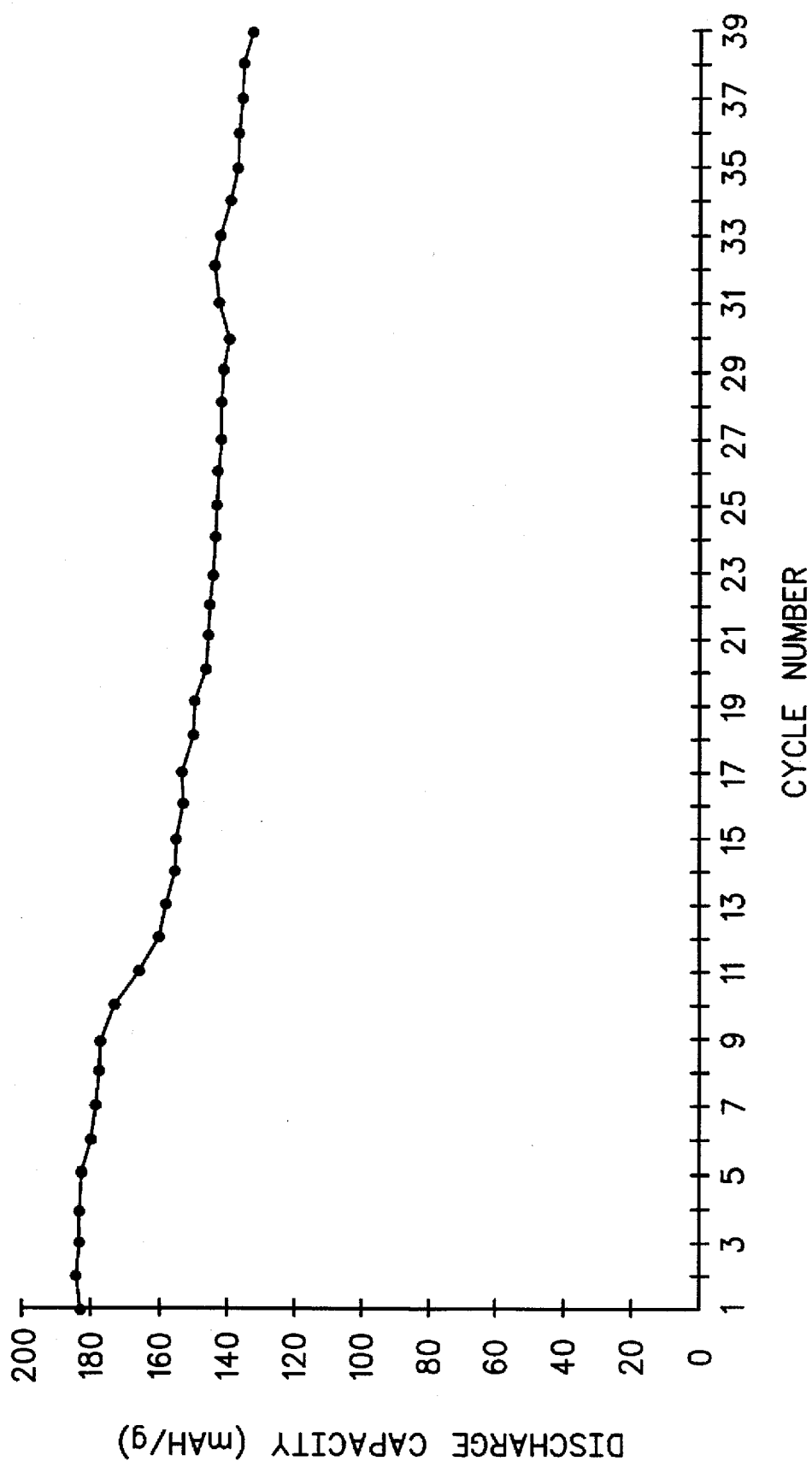
FIG. 6 is cycling data for a second electrochemical cell fabricated in accordance with the invention.

The cell was then placed in polypropylene bag before being heat sealed into metal laminate packaging capable of excluding water vapor. The cell was then gelled by heating it to 90° C. for 1.5 minutes between two insulated metal plates. The weight of the plate, 2.2 kg, provided some force to compress the cell during gelling. After gelling the cells were cycled between 3.0 and 4.2V to examine cyclability the results are shown in FIG. 6.

Example 3

Anode
composition: 88% coke (MCMB), 12% PVDF (Kynar 461)
dimensions: 2×2 cm
current collector: Cu mesh (50 µm thickness)
Cathode
composition: 87.2% LiCoO2, 7.3% graphite (Timcal KS-6), 2.4% C black, 3.1% PVDF (Kynar 461)

dimensions: 2×2
current collector: Al mesh (50 μm thickness)
Electrolyte System: polypropelyne sheet (50 μm thickness) dimensions: 3×3 cm, and 60% 1 M LiPF6 in EC/PC (50:50) dispersed in 40% PVDF (Kynar 461)

The electrodes were coated onto the mesh using a solvent casting process with NMP, with a drying temperature of approximately 120° C. After coating, the electrodes were calendered to reduce the porosity to approximately 30% for the cathode and 35% for the anode, and then cut to size. Ni tabs were welded to uncoated areas of the current collectors for the anode and cathode, respectively.

The electrodes and separator were vacuum dried for 1.5 hours in at 70° C. The cell was assembled in a glovebox environment to minimize water contamination. The electrolyte was applied to both sides of each electrode and the separator and stacked. The cell was then folded over itself one time.

Figure 7:
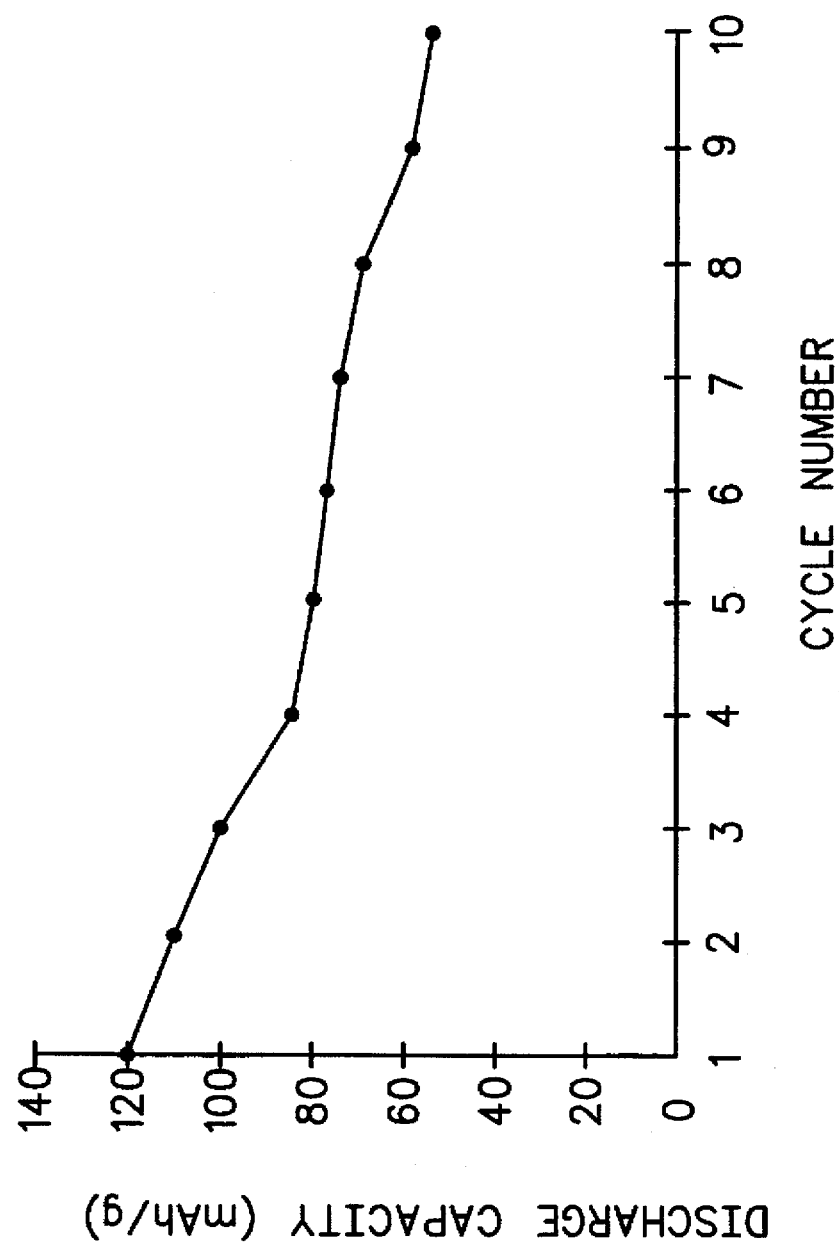
FIG. 7 is cycling data for a third electrochemical cell fabricated in accordance with the invention.

The cell was then placed in polypropylene bag before being heat sealed into metal laminate packaging capable of excluding water vapor. The cell was then gelled by heating it to 90° C. for 1.5 minutes between two insulated metal plates. The weight of the plate, 2.2 kg, provided some force to compress the cell during gelling. After gelling the cells were cycled between 3.0 and 4.2V to examine cyclability the results are shown in FIG. 7.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of making a rechargeable electrochemical cell including first and second electrodes, and a porous separator element having first and second major sides, said method comprising the steps of:

coating at least one of said electrodes or said separator with a layer of a bonding paste comprising a gelling polymer having an electrolyte active species dispersed therein;

bonding said first and second electrodes to opposite sides of said separator element; and curing said bonding paste.

2. A method as in claim 1, wherein said coating step comprises the further step of coating each of said electrodes and said separator element.

3. A method as in claim 1, wherein the curing step comprises the further steps of:

disposing said electrodes and said separator in a vapor impermeable package;

compressing said package; and heating said package.

4. A method as in claim 3, wherein said heating step comprises the further steps of heating said package to a temperature between 50° C. and 150° C. for a period of between 6 and 3,600 seconds.

5. A method as in claim 3, wherein said heating step comprises the further step of heating said package to a temperature between 80° C. and 120° C.

6. A method as in claim 3, wherein said heating step is applied for between 60 and 120 seconds.

7. A method as in claim 3, wherein said compressing step includes the step of compressing at a force of between 1 and 500 lbs/cm$^2$.

8. A method as in claim 1, wherein said porous separator element is fabricated of an inert polymer material selected from the group consisting of polyethylene, polypropylene, polytetrafluroethylene, polystyrene, polyethyleneterephthalate, ethylene propylene diene monomer, nylon, and combinations thereof.

9. A method as in claim 1, wherein said bonding paste comprises a gelling polymer selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, and combinations thereof.

10. A method as in claim 1, wherein said electrolyte active species comprises an electrolyte salt dispersed in an organic solvent.

11. A method as in claim 11, wherein said solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

12. A method as in claim 11, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

* * * * *